United States Patent [19]

Sudler

[11] 4,217,509
[45] Aug. 12, 1980

[54] SINGLE PHASE STEPPING MOTOR

[75] Inventor: Roland Sudler, Frankfurt, Fed. Rep. of Germany

[73] Assignee: Quartz-Zeit AG, Frankfurt am Main, Fed. Rep. of Germany

[21] Appl. No.: 870,134

[22] Filed: Jan. 17, 1978

[30] Foreign Application Priority Data

Feb. 11, 1977 [DE] Fed. Rep. of Germany ....... 2705685

[51] Int. Cl.² ............................................ H02K 37/00
[52] U.S. Cl. .................................................. 310/49 R
[58] Field of Search ......................... 310/49, 162–165, 310/254–259, 40 MM, 216, 218

[56] References Cited

U.S. PATENT DOCUMENTS

| | | | |
|---|---|---|---|
| 3,142,774 | 7/1964 | Lundin | 310/163 X |
| 3,858,308 | 1/1975 | Peterson | 310/156 X |
| 4,115,714 | 9/1978 | Ingenito et al. | 310/49 |

Primary Examiner—Donovan F. Duggan
Attorney, Agent, or Firm—Martin A. Farber

[57] ABSTRACT

A single phase stepping motor, particularly for clocks, with a disclike, axially magnetized rotor with a number of poles and a stator, the latter being made of two stator parts connected with one another via a bridge part, the latter carrying the excitation winding, of which each stator part has on its free end a smaller number (in comparison to the rotor pole number) of main poles with auxiliary poles attached thereon as well as a passage opening for the rotor shaft, the main poles being staggered relative to one another by the same angle, the main poles being directed towards the face sides of the rotor. The main poles and the auxiliary poles which are coordinated to a stator part form an integral unit made of sheet metal with this stator part.

7 Claims, 3 Drawing Figures

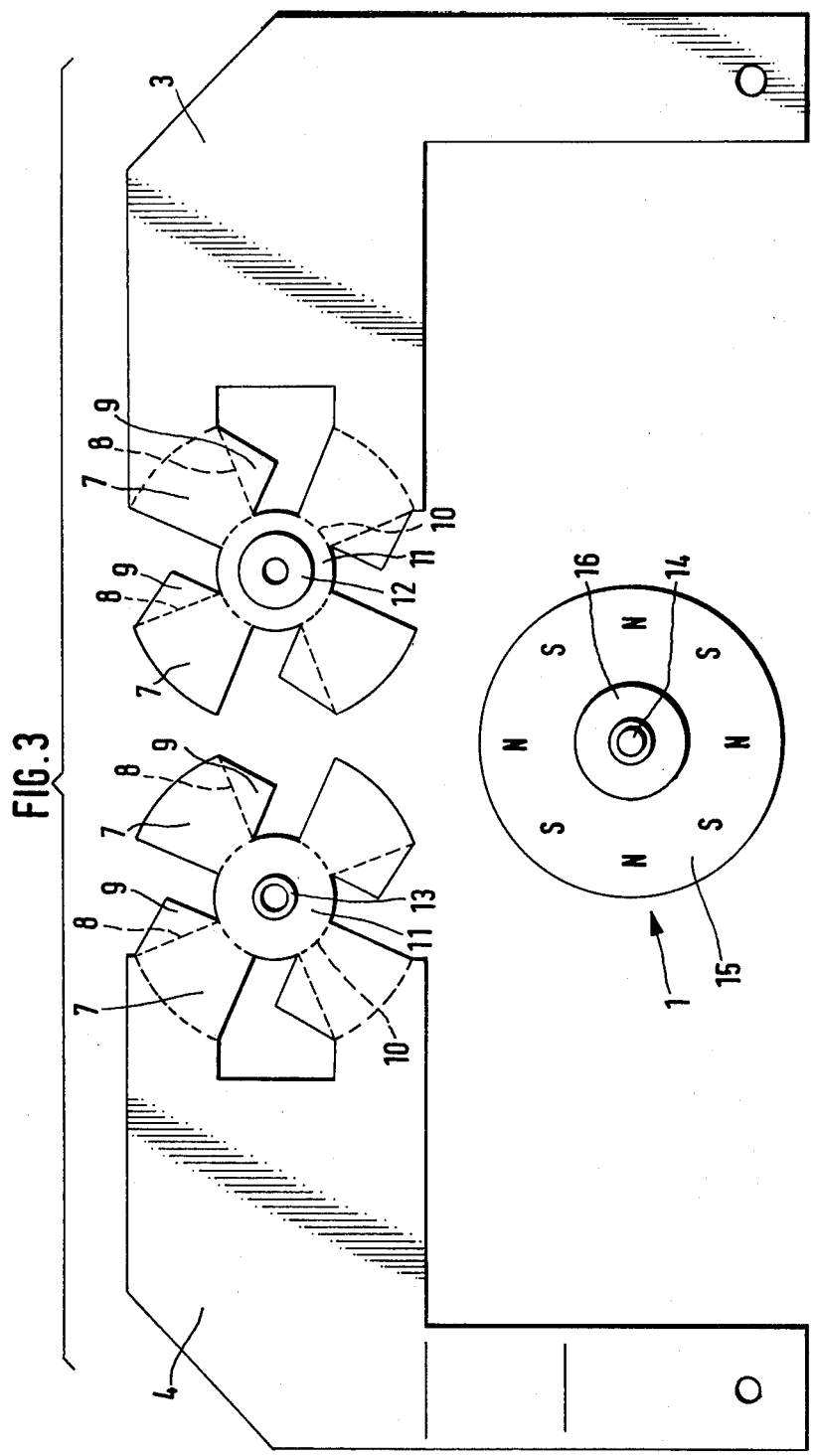

SINGLE PHASE STEPPING MOTOR

The invention relates to a single phase stepping motor, particularly for clocks, with a disc-like, axially magnetized rotor with a number of poles and a stator, the latter being made of two stator parts connected with one another via a bridge part, the latter carrying the excitation winding, of which each stator part has on its free end a smaller number (in comparison to the rotor pole number) of main poles with auxiliary poles attached thereon as well as a passage opening for the rotor shaft, the main holes being staggered or displaced relative to one another by the same angle, the main poles being directed toward the face sides of the rotor.

One phase stepping motors of this type are already known, by which on the two stator parts, which comprise a high permeable material, there are arranged respectively pole pieces made of pure iron. In the circumferential direction the pole pieces have different heights or levels, whereby main poles and auxiliary poles are formed. The rotor comprises a disc made of a platinum-cobalt alloy with an even number of teeth, which respectively are magnetized in the axial direction. The rotor disc rotates between the pole pieces, which pole pieces project from the stator parts towards the face surfaces of the rotor disc. Such type of single phase stepping motors have the advantage that on the basis of the comparatively small air gap between the poles which are axially opposite one another, they have a very small energy consumption and a very high efficiency with small construction volumes.

It is an object of the present invention to further improve these single phase stepping motors with respect to their energy consumption, their efficiency and their construction volumes.

This object is aided in accordance with another object of the invention in the manner that the main poles and auxiliary poles which are coordinated to a stator part form with this stator part an integral unit made of sheet metal.

By this measure the air gap between the main poles and auxilary poles of both stator parts, which poles are opposite one another over the rotor disc, is allowed to be substantially further reduced, whereby the efficiency is permitted to increase and the energy consumption is allowed to be reduced. Moreover the construction height of the motor becomes smaller. A particular advantage of the invention resides in that the stator parts with the main poles and auxiliary poles can be produced substantially simpler and at more favorable cost than the corresponding parts of the known motors. Thus the possibility exists to be able to stamp out or punch out from sheet metal, each stator part with the main- and auxiliary-poles and the passage opening which are associated therewith, in a single working step or cutting stroke.

According to one embodiment of the invention each main pole (e.g., 7) is formed in the manner of a circular annular sector, which sector at a radial limit line (8) passes into a triangular projection or set-off (9), the latter serving as an auxiliary pole, and on its inner circumferential limit line (10) pases into a ring (11) enclosing the rotor shaft passage opening. Such an embodiment, in comparison to other likewise possible embodiment forms by which for example the auxiliary poles are formed by tabs which are angled-off from the main poles, has the advantage that a particularly compact construction is achieved with a smallest possible air gap, which has positive results in efficiency and energy consumption of the motor. Moreover the punching or stamping tools or dies for the preferred embodiment have a construction which is more favorable in production than that for the other embodiments.

A further additional increase in the efficiency may be achieved in the manner that the stator parts (3, 4) are made of a soft magnetic material (or low retentive material) of low coercive force or retentivity. With the materials, known under the trade names Hyperm, Hyperm 766, Hyperm 800, Hyperm 900 and Hyperm Max., advantageous results could be achieved. These materials are deformable or workable cold so that the stator parts with the main- and auxiliary-poles can be stamped out.

A further positive influence on the efficiency and the energy consumption of the motor may be achieved in the manner that the rotor comprises synthetic material or plastic bonded permanent magnets made of a lanthanide-ferromagnetic alloy. With such types of alloys particularly high energy products (BH) max. may be attained. It has proven particularly advantageous to provide a lanthanide-cobalt alloy as a permanent magnet material, since this in the previous specified alloy group has a particularly favorable (BH) max.-value. Still a samarium-cobalt alloy is advantageous, which possesses a maximum energy product in the order of magnitude of 120 kJ/m$^3$.

A further reduction of the energy consumption of the motor can be achieved by the use of a rotor with a highest possible number of poles. Namely, the higher the number of the rotor poles, the smaller the angle of rotation of each step and the lower can the energy content of the control pulses by chosen. It has proven particularly advantageous to construct the rotor 60 polar and the stator 30 polar. A motor with such a rotor not only has a most extremely low energy consumption, but beyond that also still has the advantage that since the rotor rotates with a second step, the rotor shaft can be used directly as a seconds shaft. On the basis of functional efficiency it can be suitable to form the rotor 60 polar and the stator 10 polar, since with a greater polar stator, the formation of the individual main- and auxilliary-poles can lead to certain difficulties.

With the above and other objects and advantages in view, the present invention will become more clearly understood in connection with the following detailed description of a preferred embodiment, when considered with the accompanying drawings, of which:

FIG. 3 is an exploded illustration of the single phase stepping motor according to FIG. 1 without the excitation coil; each in substantially enlarged illustration.

Figure 1:
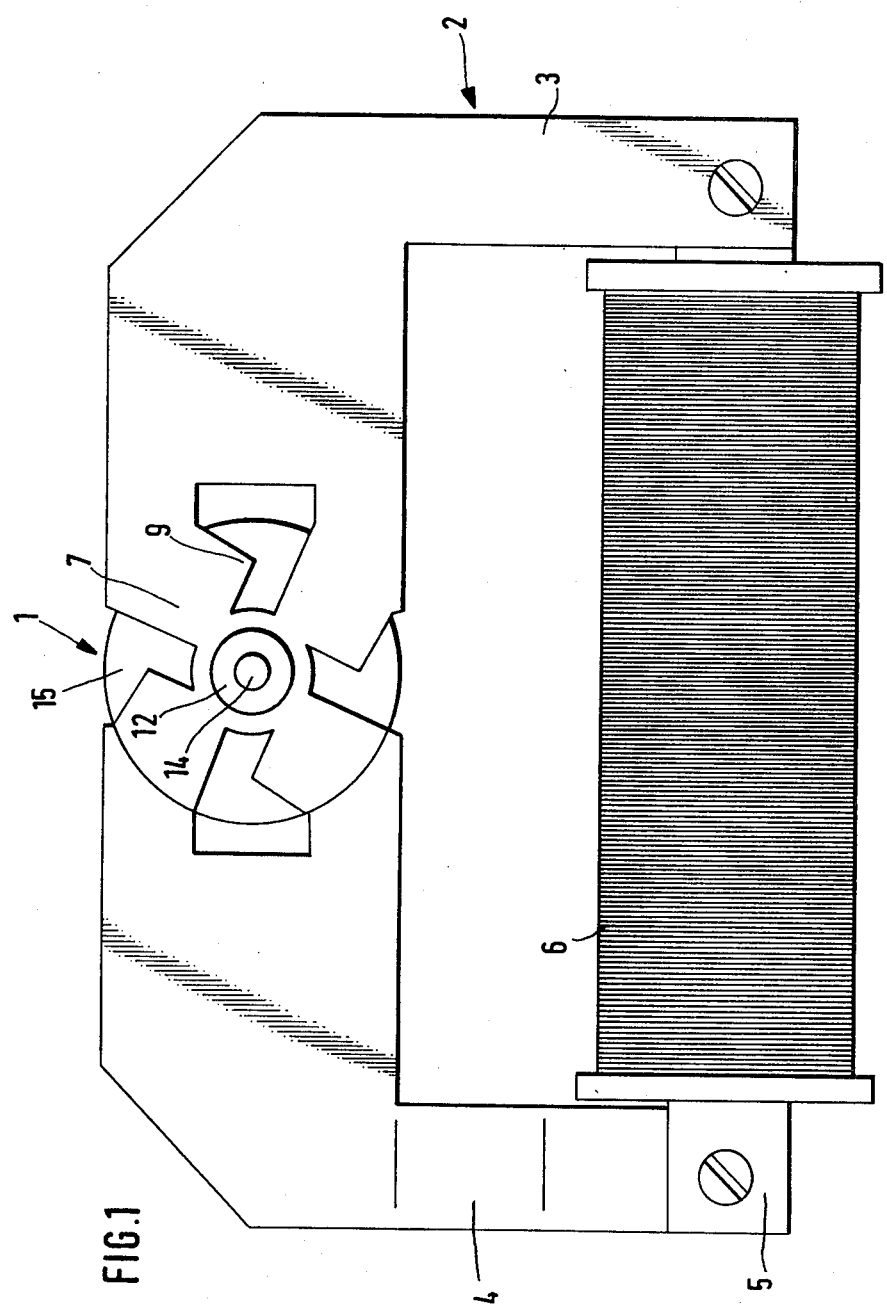
FIG. 1 is a plan view of a single phase stepping motor with a four polar stator and an eight polar rotor.
Figure 2:
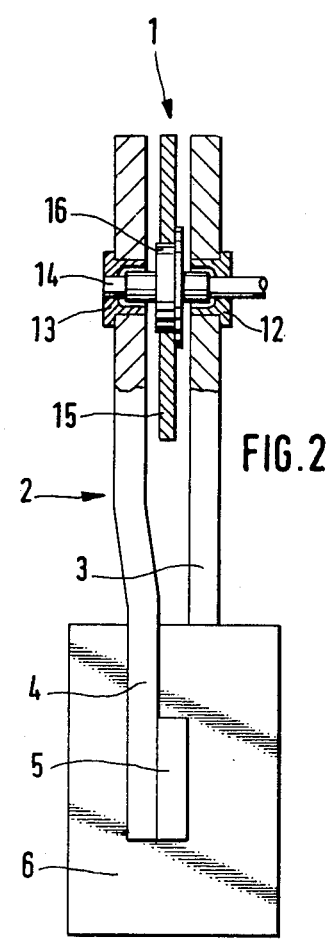
FIG. 2 is a side elevational view of a single phase stepping motor according to FIG. 1, partially in section.

Referring now to the drawings, a single phase stepping motor in accordance with the present invention comprises an eight polar rotor 1 and a stator 2, the latter comprising two stator parts 3 and 4 as well as a bridge part 5 connecting these two parts with the excitation coil 6.

Each stator part 3 and 4, respectively, carries on its end adjacent to the rotor 1 four annular sector shaped main poles 7, from which each transfers at a radial limit line 8 into a triangular auxiliary pole 9, the free end point of the latter pointing in the circumferential direction. On their inner circumferential limit lines 10 the main poles transfer into a ring 11 in which there is seated a bushing or socket 12 and 13, respectively, for mounting the rotor shaft 14. The stator parts 3 and 4 each form an integral unit respectively with the main poles 7 and auxiliary poles 8 which are associated with them.

Both of these units as well as the bridge part 5 are produced by stamping out or punching out from a Hyperm-766 sheet or sheet metal.

The rotor 1 is made of a plastic or synthetic material bonded permanent magnet disc 15, with which a samarium-cobalt alloy is used as the magnetic material. The permanent magnet disc 15 is forced or pressed on a bushing or socket 16 which forms an integral unit with the rotor shaft 14.

For appreciation of the natural dimensions of such a type of motor which is laid out or rated for an operating voltage of less than or equal to 1.5 volts, the following attainable dimensions may be stated: length approximately 9 mm, width approximately 5 mm and height approximately 3 mm.

While there has been disclosed one embodiment of the present invention, it is to be understood that this embodiment is given by example only and not in a limiting sense.

I claim:

1. In a single phase stepping motor, particularly for battery driven clocks, with a disc-like, axially magnetized rotor with a number of poles and a stator, the latter being made of two stator parts connected with one another via a bridge part, the latter carrying the excitation winding, of which each stator part has on its free end a smaller number (in comparison to the rotor pole number) of main poles with auxiliary poles attached thereon as well as a passage opening for the rotor shaft, the main poles being staggered relative to one another by the same angle, the main poles being directed towards the face sides of the rotor, the improvement wherein
    the main poles and auxiliary poles associated with a stator part form an integral unit made of sheet metal with said stator part,
    each of said main poles is formed as an annular-like sector,
    said annular-like sector defines a radial limit line, said annular-like sector transfers at said radial limit line into a triangular-like projection, the latter constituting an auxiliary pole, said annular-like sector defines an inner circumferential limit line, said annular-like sector transfers at said inner circumferential limit line into a ring enclosing the passage opening for the rotor shaft.

2. The single phase stepping motor as set forth in claim 1, wherein
    said stator parts are made of a soft magnetic material of low retentivity.

3. The single phase stepping motor as set forth in claim 2, wherein
    said rotor is made of a synthetic material bonded permanent magnet made of a lanthanide-ferromagnetic alloy.

4. The single phase stepping motor as set forth in claim 3, further comprising
    a lanthanide-cobalt alloy constitutes material of the permanent magnet.

5. The single phase stepping motor as set forth in claim 4, wherein
    said material is a samarium-cobalt alloy.

6. A single phase stepping motor as set forth in claim 1, wherein
    said rotor has 60 poles and
    said stator has 30 poles.

7. A single phase stepping motor as set forth in claim 1, wherein
    said rotor has 60 poles and said stator has 10 poles.

* * * * *

UNITED STATES PATENT AND TRADEMARK OFFICE
CERTIFICATE OF CORRECTION

PATENT NO. : 4,217,509
DATED : August 12, 1980
INVENTOR(S) : Roland Sudler

It is certified that error appears in the above-identified patent and that said Letters Patent are hereby corrected as shown below:

Item [73] Assignee name "Quartz-Zeit" should read --Quarz-Zeit--

Signed and Sealed this

Twenty-fifth Day of November 1980

[SEAL]

Attest:

SIDNEY A. DIAMOND

Attesting Officer

Commissioner of Patents and Trademarks